United States Patent Office 3,039,685
Patented June 19, 1962

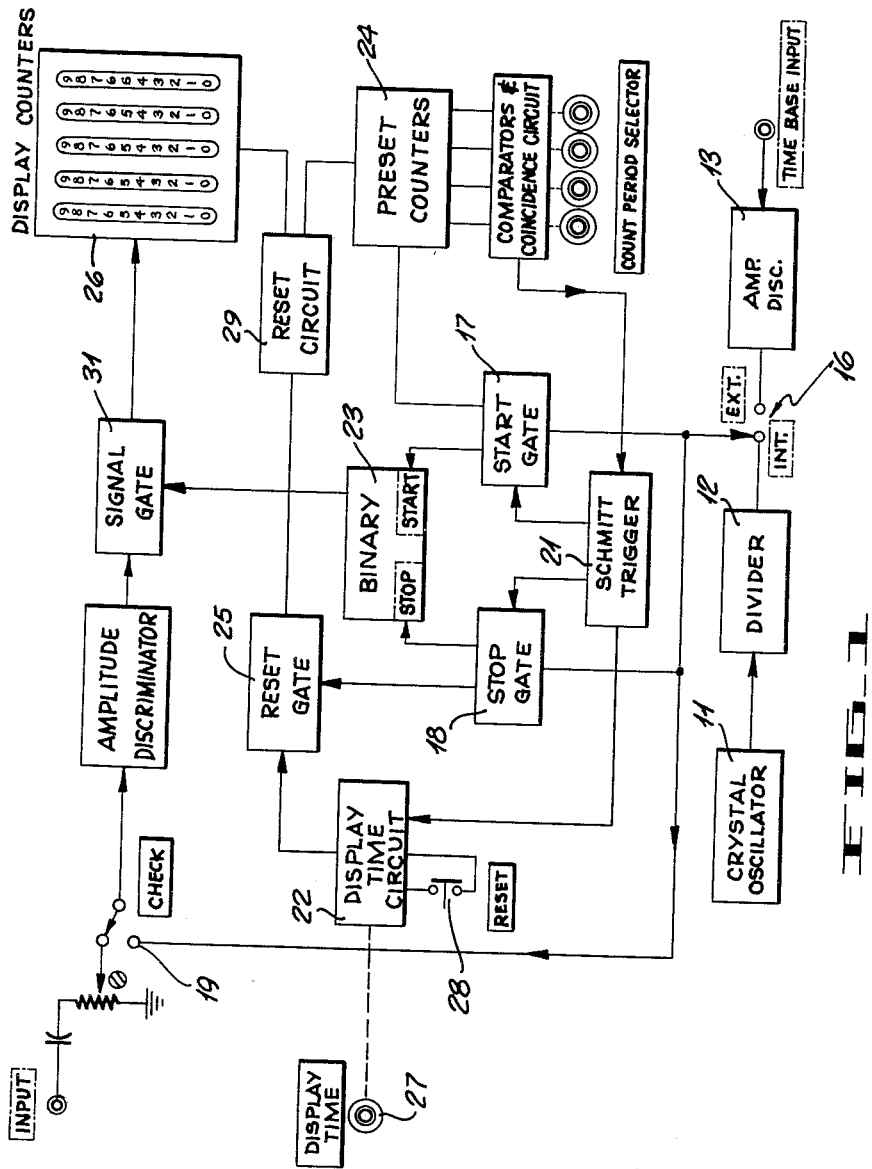
FIG-1
ALAN S. BAGLEY &
ROBERT E. RAWLINS
INVENTORS
BY 
ATTORNEYS

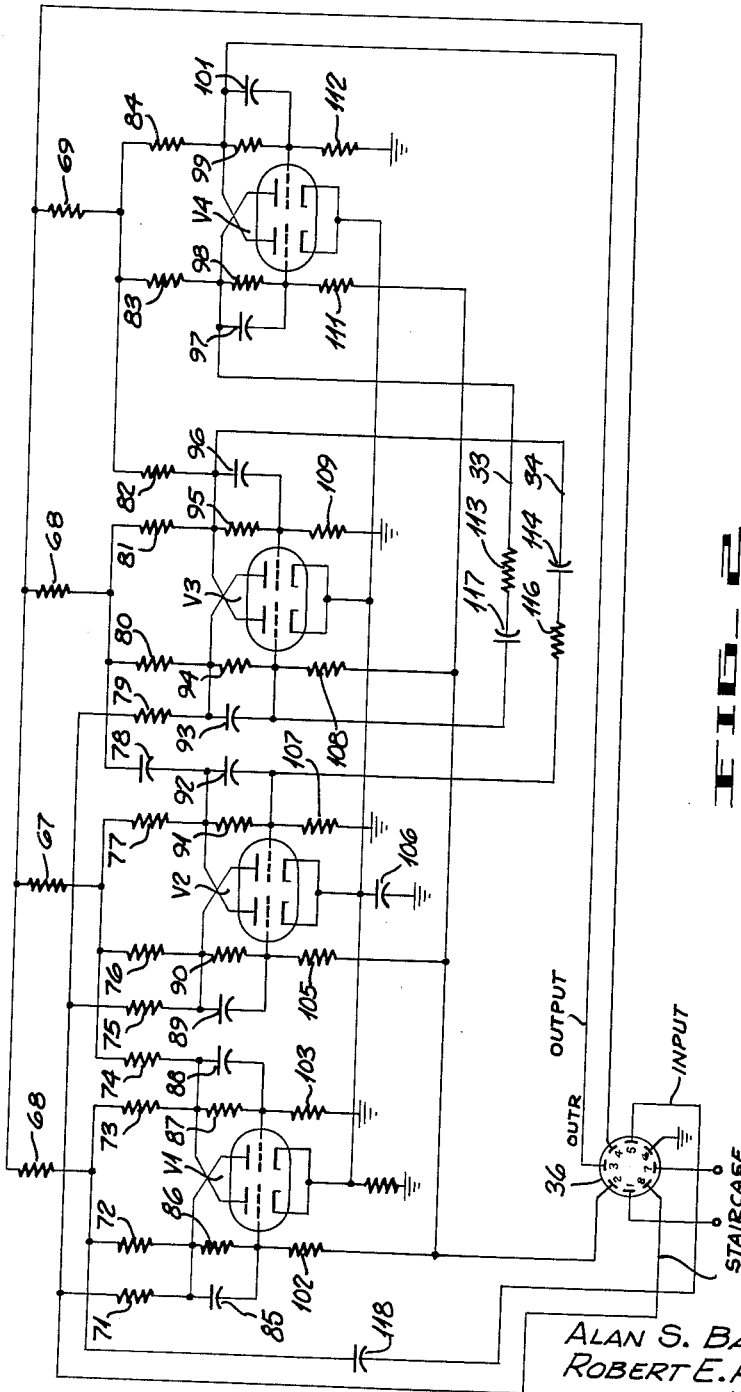

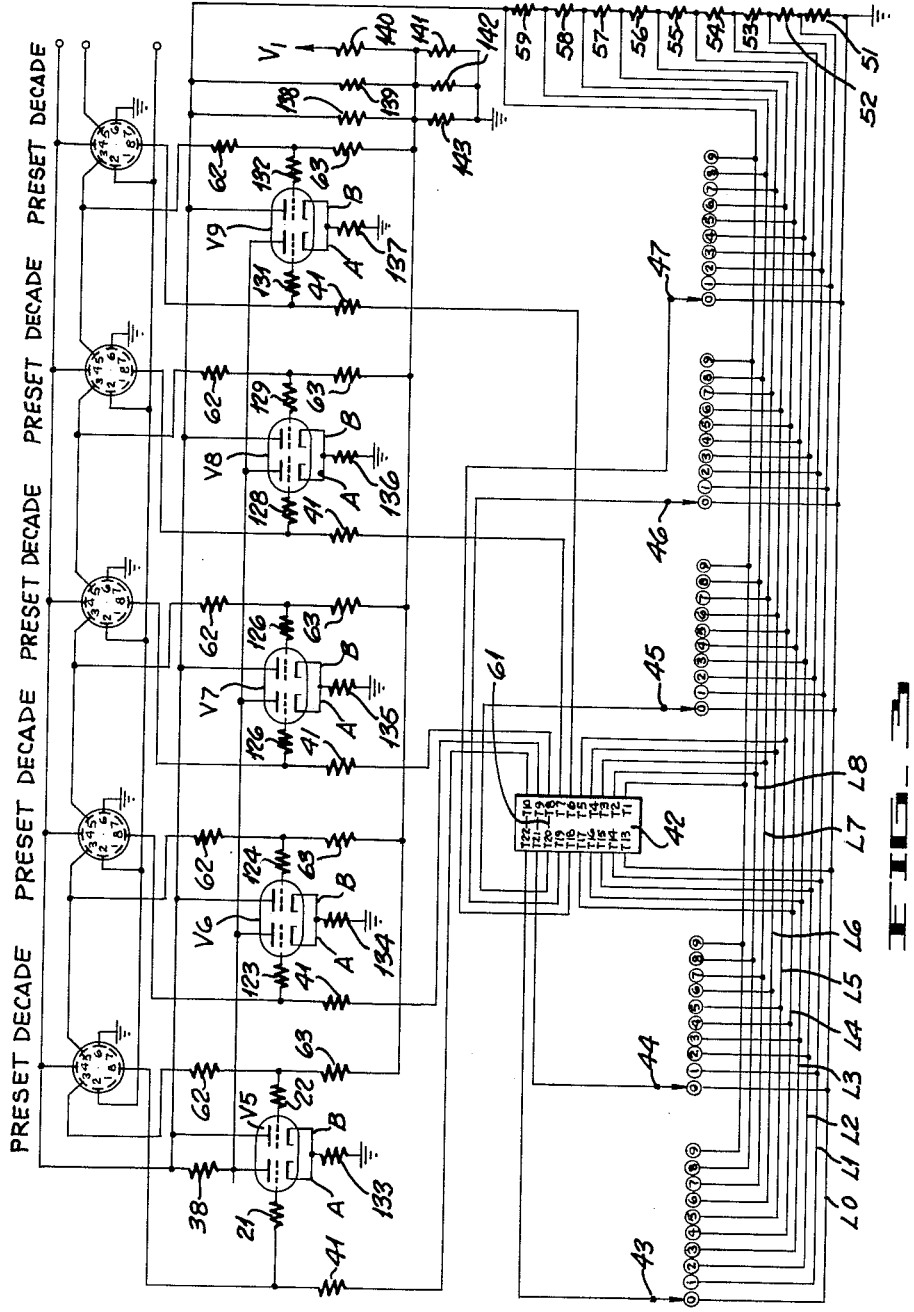

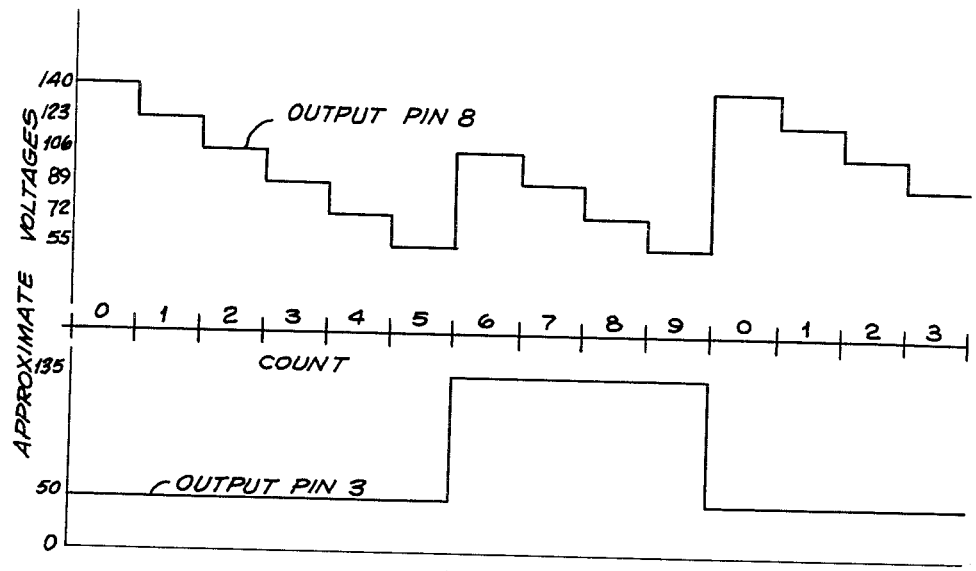
FIG_4
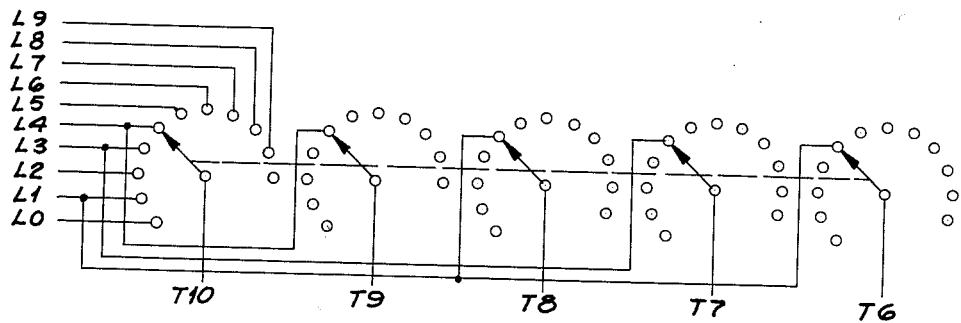
FIG_6
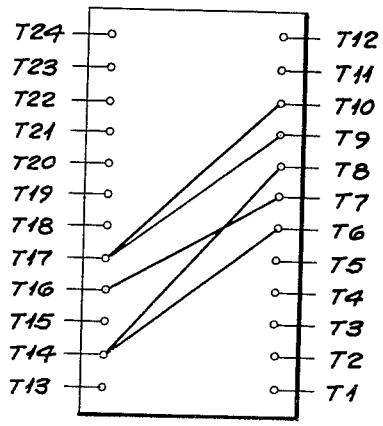
FIG_5
ALAN S. BAGLEY &
ROBERT E. RAWLINS
INVENTORS
BY
ATTORNEYS

3,039,685
ELECTRONIC COUNTER
Alan S. Bagley, Los Altos, and Robert E. Rawlins, Palo Alto, Calif., assignors to Hewlett-Packard Company, Palo Alto, Calif., a corporation of California
Filed Mar. 27, 1957, Ser. No. 648,875
4 Claims. (Cl. 235—132)

This invention relates generally to electronic counters and more particularly to electronic counters having a variable time base.

It is often desirable to be able to measure such quantities as speed, r.p.m., pressure, thickness and weight accurately and rapidly. If these quantities can be converted into electrical impulses, they may be easily measured by electrical instruments. For example, the pulses may be applied to an electronic counter which counts the pulses over a fixed period of time (the time base), and displays the count. The desired quantity is then obtained by computation. It is apparent that such calculations are time consuming and subject to error. Further, highly skilled personnel is generally required to use the instrument and carry out the computation.

It is an object of the present invention to provide an electronic counter that counts periodic and random events and displays the result.

It is another object of the present invention to provide an electronic counter in which the time base may be accurately preset to a predetermined value.

It is another object of the present invention to provide an electronic counter which may be used by unskilled personnel and which presents the desired quantity directly in easy to read digital form.

It is another object of the present invention to provide a variable time base electronic counter in which a time base may be preset by insertion of a prewired selector plug or adjustment of a prewired switch.

It is another object of the present invention to provide an electronic counter in which the input pulses are applied to a display counter for a preselected period of time which is determined by preset counters operating in conjunction with a crystal controlled oscillator.

It is still another object of the present invention to provide novel preset counter means for establishing an accurate time base.

These and other objects of the invention will become more clearly apparent from the following description when read in conjunction with the accompanying drawing.

Referring to the drawing:

FIGURE 1 is a block diagram of a variable time base electronic counter;

FIGURE 2 is a detailed circuit diagram of a preset decade counter used in the time base section;

FIGURE 3 is a circuit diagram of the comparator for the time base section;

FIGURE 4 shows the waveforms applied to the comparator;

FIGURE 5 shows a typical connection for a selector plug; and

FIGURE 6 shows a typical connection for ganged selector switch.

Basically, the counter comprises display counters which serve to receive impulses and to count the same, and a time base section for accurately controlling the period of time during which the display counters are counting. The time base section includes a plurality of cascaded preset counters which count pulses supplied by a stable frequency source; and comparators connected to receive voltages from the preset counters and serving to generate an output pulse when a preset count is reached by the preset counters.

Referring to FIGURE 1, a block diagram of a variable time base counter is presented. An accurate internal time base signal of predetermined fixed frequency is generated by the crystal oscillator 11. The output of the crystal oscillator is applied to a divider 12 which serves to divide down the frequency and to form impulses having a lower frequency. For example, in one instance the oscillator operated at a frequency of 100 kc. and the divider was a 10 to 1 decade divider providing output impulses at a 10 kc. rate.

An external time base generator may also be employed. The signal from the external time base generator is applied to an amplitude discriminator. The discriminator comprises a differential amplifier connected to a multivibrator or flip-flop circuit. The unit is used as a wave shaper to provide uniform pulses to operate the gate circuits and to drive the preset decade counters. A suitable amplitude discriminator is shown and described in copending application Serial No. 423,409, entitled "Electronic Counter," filed April 15, 1954, now Patent No. 2,851,596.

The switch 16 provides means for connecting the counter circuit either to the internal time base generator or to the external time base generator as desired. The time base signal is applied simultaneously to the start gate 17, the stop gate 18 and to the terminal 19. The start and stop gates are preferably of the dual pentode type.

The start and stop gates and the display time circuit 22 are controlled by the Schmitt trigger 21, to be presently described. When the start gate 17 is open, the time base signal is applied to the start side of the binary 23 and to the preset counters 24. When the stop gate 18 is open, the start gate 17 is closed and the time base signal is applied to the stop side of the binary 23 and to the reset gate 25.

The display time circuit 22 controls the opening and closing of the reset gate 25. The display time circuit may be set to give any predetermined display time for the display counters 26. The display time can be controlled by a knob 27 provided on the face of the instrument. Means are also provided for setting the display time circuit so that the display counters will display the count until the reset switch 28 is manually operated. A suitable display time circuit is shown and described in the aforementioned copending application. The reset gate 25 serves to control the application of impulses to the reset circuit 29 and is preferably of the dual triode type gate. The reset circuit 29 forms a reset pulse in response to an impulse. The reset pulse resets the display and preset counters to zero. The reset circuit may be of the thyratron type.

The binary 23 serves to control the signal gate 31 which may be of the pentode type. The input signal is applied through the gate 31 to the display counters 26. An amplitude discriminator serves to shape the input impulses to provide uniform pulses to operate the decade counters. The amplitude discriminator circuit may be of the type described in the aforementioned application. The display counters 26 comprise a plurality of cascaded decade counters which serve to count input pulses and to display the count.

The preset counters 24 comprise a plurality of decade counters connected in cascade. Each of the decades consists of four binary circuits connected in a conventional manner. With four binaries, 16 input impulses would be required to obtain one negative output pulse. However, by the use of feedback loops six extra counters are added within the units whereby only ten impulses are required to obtain one negative output pulse from the decade giving a division by ten. The feedback circuit is shown at 33 and 34 of FIGURE 2. A more complete description of a decade counter together with the feedback circuit is given in Patent No. 2,762,915, issued September 11, 1956.

As shown in FIG. 2, input pulses are applied to the decade counters at pin 5 of the octal plug 36. An output staircase voltage is available at pin 8 of the plug. The staircase voltage is generated by connecting one plate of each of the first three binaries to a common point through a relatively high resistance. The output of the fourth binary appears at pin 3 of the octal plug 36. The waveforms at pins 3 and 8 are shown in FIGURE 4. It should be noted that the staircase voltages are unique for a given count only at two voltage levels. At any other voltage level, any external circuitry which is to utilize the staircase voltage must have some means of distinguishing the two possible counts represented by a given voltage level.

Referring to FIGURE 3, a five digit preset comparator circuit is illustrated. A comparator and an associated decade counter must be used for each digit in the number that it is desired to preset. A common plate load 38 is used for the A-section of each of the comparators. A reference voltage is applied to the grid of the B-section of each of the comparator tubes. The plate of the B-section of each of the comparator tubes is connected to the positive voltage supply. The comon cathode of the tubes is held very close to the grid voltage of the section B.

The voltage at the plate A of the tube is determined by the grid voltage of the section A with respect to that of section B. If the grid voltage of the section A is above the grid voltage of section B, then section A will begin to conduct heavily and the plate voltage of section A will drop to a low value. If the voltage at the grid A is only slightly lower than the voltage at the grid B, section A is cut off and the voltage at plate A rises to a high value.

The circuitry at grid A is arranged so that the voltage from the associated decade counter, pin 8 of the octal plug and a selector voltage, to be presently described, are both applied to the grid A. The selector voltage applied varies between two fixed voltage values as the unit is preset to count from zero to nine. The resistor 41 is so chosen that when the staircase and selector voltages are added, the voltage at the grid of section A will drop below that of the grid of section B when the desired count is reached.

As illustrated, the grids of the sections A of the comparator circuit are connected to the terminals T6—T10 of the plug 42 through the resistors 41. The contact arm of switches 43—47 are connected to the terminals T18—T22. The contacts of the switches 43—47 are connected in parallel to the lines L0—L9. The lines L0—L9 are connected to the common terminals of the serially connected resistors 51—59 which are of equal value. Thus, voltages varying between zero and the voltage applied to the other end of the serially connected resistors in equal steps is available at the lines L0—L9. By positioning the switches 43—47, any desired voltage may be applied to each of the terminals T18—T22 of the plug 42.

The terminals T1—T5 and T13—T17 of the plug are connected to the lines L0—L9. By employing jumpers in the male unit between the terminals T1—T5 and T13—T17, any of the voltages may be applied directly to the terminals T6—T10 as desired. If the jumpers are as indicated by the lines 61, then the grids of the sections A are connected to the switches 43—47 and may be manually preset to the desired value. Whereas, if the jumpers are arranged as previously described, then upon plugging in the male unit preselected voltages are applied to the grids of the sections A, and the manual preselect is disconnected from the circuit, thus giving a preselected time base.

The output voltage of the last binary of each of the decades increases at the count of 6. This voltage is applied to grid B of the associated comparator through a voltage divider network comprising resistors 62 and 63. At this count the grid of each of the sections B is raised sufficiently to compensate for the discontinuity in the staircase voltage at the count of 6 (FIGURE 4) for each of the decades. This shift in reference voltage is such that the differential voltage between the grids of the sections A and B behaves as if the staircase were a normal ten step descending staircase. By using the modified staircase, which requires this compensation, each of the steps in the staircase may be made considerably larger, and the comparator operation is more stable.

With the common plate load connected to all of the sections, all of the comparators must be cut off for the output voltage to rise to a high enough value to operate the Schmitt trigger as will be presently described. If one section remains conducting, it will effectively shunt the others with a low impedance and they will only have a small effect on the plate voltage of the remainder.

Operation of the time base section is then as follows: Assuming that it is manually preset, each of the switches 43, 44, 45, 46 and 47 are set to the desired digit. For example, it might be desirable to measure flow in liters per hour and display the flow directly with a flow meter which produces 3087 pulses per gallon. The time base required is 4.4131 seconds. The switches are preset to 44131. The decades will count until 44131 cycles at 10 kc. frequency. At this time each of the sections A of the comparator will become conducting and the voltage at the plates will rise to a steady value. However, during the count it may vary considerably. This voltage is applied to the Schmitt trigger 21, to be presently described. As long as any of the comparators are not cut off, the plate voltage will not rise to its maximum value since the ones which remain conductive effectively shunt the conducting ones.

The Schmitt trigger is employed to improve the rise time of the step function output of the comparator circuit, and to supply standard voltages to control the start and stop gates 17 and 18 and the display time circuit 22. As is well known, a Schmitt trigger is a circuit which is stable in either of two states. The transition between the two stable states is dependent upon the value of the voltage applied thereto. The circuit remains in one stable state for any input voltage above the triggering value and will remain in the other state for input voltages below this value. Generally, the circuit constants are chosen whereby the circuit is triggered when the input voltage rises above a given voltage, and again when the input voltage drops below a slightly lower voltage. The difference in the trigger levels being referred to as the hysteresis of the circuit.

Overall operation of the counter is, therefore, as follows: The oscillator 11 provides an accurate time base signal. This signal passes to a divider of the decade type which produces pulses at its output at a rate depending upon the division. Preferably, as previously explained, the oscillator is a 100 kc. oscillator and the divider a decade divider dropping the frequency to 10 kc. With a switch 16 in the internal position, these impulses are supplied to the input of the start and stop gates 17 and 18 and to the check terminal 19.

Assuming for purposes of explanation that the start gate has just opened, the next pulse appearing at this gate is allowed to pass through the gate to the start input of the gate binary 23. This pulse triggers the binary into a start state. The binary remains in this state, regardless of further impulses applied to the start input, until a pulse arrives at the stop input. When the binary is in the start state, it supplies a voltage to the signal gate 31 such that the gate is held open. The display counters then count pulses arriving from the input terminal through the amplitude discriminator and the signal gate.

Pulses from the time base continue to pass through the start gate 17 as long as the gate is open. The first of these triggers the gate binary, as previously described, but these pulses are also supplied to the preset counters, which continuously count the time base signal for the time that the start gate 17 is open.

This condition (display counters counting input and preset counters counting the time base) persists until the preset counters reach a count which has been preset. At this time, the comparator circuit registers coincidence of the count set on the dials with the count in the preset counters. This circuit then supplies a positive step voltage to the Schmitt trigger 21, as previously described. This voltage causes the Schmitt trigger to change to its other stable condition, in which the start gate 17 is closed and the stop gate 18 is opened. When the start gate is closed, pulses are no longer supplied to the input of the preset counters and these remain at the preset count.

As the Schmitt trigger changes state, it supplies a positive pulse to the display time circuit 22. This circuit is then triggered into a condition which holds the reset gate 25 closed. With the stop gate open, the next pulse from the time base generator, after the preset counters have reached the desired count, is applied to the stop input of the gate binary. This pulse causes the binary to change to its stop state in which the signal gate is held closed, and the display counters no longer count, but display the count accumulated as of the closing of the gate.

While the stop gate is open, pulses are also supplied to the input of the reset gate. This gate, however, is held closed by the display time circuit. This condition (display counters indicating some count, and preset counters at the predetermined count) persists until the display time is over. At this time the display time circuit opens the reset gate and the next pulse from the time base passes through and triggers the reset circuit. The reset circuit serves to form a pulse which resets both the display counters and the preset counters to zero.

When the preset counters are reset, the comparators no longer register coincidence. Therefore, the voltage they supply to the Schmitt trigger drops, and the trigger changes to its original stage in which the start gate is open and the stop gate is closed. The cycle of operation now repeats as described above. It should be noted that the signal gate is operated directly by pulses from the time base.

When the instrument is used for ratio measurement, the internal time base signal is replaced by an external signal.

The selector plug 42 which may be fitted into the front panel provides means for instantaneously setting the gate time to a preselected number. This not only saves time but prevents possible error in applications where the same setting is required repeatedly. The preselected number can be changed quickly and additional selector plugs may be made available to provide the operator with any desired number of options. The plugs are inserted in either of two positions and when turned in one position the gate time is adjusted to any multiplier by means of the front panel knobs which control the switches 43—47. A plug wired to give the result previously referred to is schematically shown in FIGURE 5.

In certain applications it is desirable to obtain a number of preset time bases rapidly. In such event, it would be time consuming to remove and replace plugs of the type described. Prewired switches provide a simple and convenient means for obtaining a number of predetermined time bases rapidly. The switches employed may be any of the well known multiple contact type switches such as a push button switch, a rotary switch or similar type. To obtain a preselected count, the operator need only push the appropriate button or rotate the switch to a preselected position.

A rotary type ganged switch wired to give the time base previously referred to is shown in FIGURE 6. As illustrated, only contact number 5 is wired. However, it is apparent that other preset time bases may be wired to the other contacts to give a plurality of time bases.

Employing switches of the above character simplifies many applications in which the instrument is used. For example, the percent deviation from a plurality of values may be displayed by appropriately selecting the time base.

A counter was constructed in accordance with the foregoing in which the various gates, amplitude discriminators and the binary were of well known types. The oscillator operated at 100 kc. with a 10:1 decade divider reducing the frequency to 10 kc. The display counters were of the type known by manufacturer's specification as "Hewlett-Packard Model AC–4A." The preset counters were of the type illustrated in FIGURE 2 with the circuit elements having the following values:

Tubes: V1–V4—Type 5963
Voltages: +V—300 v.

Resistors:
| | | |
|---|---|---|
| 66 | ohms | 27,000 |
| 67 | do | 47,000 |
| 68 | do | 47,000 |
| 69 | do | 47,000 |
| 71 | megohms | 1.39 |
| 72 | ohms | 43,000 |
| 73 | do | 43,000 |
| 75 | do | 500,000 |
| 76 | do | 47,000 |
| 77 | do | 47,000 |
| 79 | do | 500,000 |
| 80 | do | 47,000 |
| 81 | do | 47,000 |
| 83 | do | 47,000 |
| 84 | do | 47,000 |
| 86 | do | 270,000 |
| 87 | do | 270,000 |
| 90 | do | 270,000 |
| 91 | do | 270,000 |
| 94 | do | 270,000 |
| 95 | do | 270,000 |
| 98 | do | 270,000 |
| 99 | do | 270,000 |
| 102 | do | 100,000 |
| 103 | do | 100,000 |
| 104 | do | 3,000 |
| 105 | do | 100,000 |
| 107 | do | 100,000 |
| 108 | do | 100,000 |
| 109 | do | 100,000 |
| 111 | do | 100,000 |
| 112 | do | 100,000 |
| 113 | do | 180,000 |
| 116 | do | 150,000 |

Capacitors:
| | | |
|---|---|---|
| 74 | $\mu\mu f$ | 27 |
| 78 | $\mu\mu f$ | 39 |
| 82 | $\mu\mu f$ | 47 |
| 85 | $\mu\mu f$ | 39 |
| 88 | $\mu\mu f$ | 39 |
| 89 | $\mu\mu f$ | 27 |
| 92 | $\mu\mu f$ | 27 |
| 93 | $\mu\mu f$ | 39 |
| 96 | $\mu\mu f$ | 39 |
| 97 | $\mu\mu f$ | 39 |
| 101 | $\mu\mu f$ | 39 |
| 106 | $\mu f$ | .01 |
| 114 | $\mu\mu f$ | 39 |
| 117 | $\mu\mu f$ | 75 |
| 118 | $\mu\mu f$ | 100 |

The comparator circuit was of the type illustrated in FIGURE 3 with the circuit elements having the following values:

Tubes: V5–V9—Type 5965
Voltage:
+V₁—300 v.
+V₂—200 v.

| Resistors: | Ohms |
|---|---|
| 38 | 47,000 |
| 41 | 370,000 |
| 51 | 2,450 |
| 52 | 2,450 |
| 53 | 2,450 |
| 54 | 2,450 |
| 55 | 2,450 |
| 56 | 2,450 |
| 57 | 2,450 |
| 58 | 2,450 |
| 59 | 2,450 |
| 62 | 436,000 |
| 63 | 479,000 |
| 121 | 100 |
| 122 | 100 |
| 123 | 100 |
| 124 | 100 |
| 126 | 100 |
| 127 | 100 |
| 128 | 100 |
| 129 | 100 |
| 131 | 100 |
| 132 | 100 |
| 133 | 25,000 |
| 134 | 25,000 |
| 135 | 25,000 |
| 136 | 25,000 |
| 137 | 25,000 |
| 138 | 62,000 |
| 139 | 62,000 |
| 140 | 100,000 |
| 141 | 270,000 |
| 142 | 62,000 |
| 143 | 62,000 |

The counter constructed in accordance with the foregoing provided a time base which was variable between .0001 second and 9.9999 seconds.

Thus, it is seen that an improved counter has been provided in which the time base is adjustable to any predetermined accurate value whereby the display counters can display the desired quantity directly. The plug in unit or selector switch provide means for wiring predetermined time bases into the instrument. Unskilled personnel need only set the switch to a given position or insert the appropriate male plug and the counter will display the desired quantity directly.

We claim:
1. An electronic counter comprising display counters serving to count input pulses and to display the count, a gate means to control the application of input pulses to the display counters, gate control means to control the opening and closing of said gate, means forming timing pulses, preset counting means to receive and count said timing pulses, said preset counting means comprising a plurality of decade counters connected in cascade, each of said decade counters generating a staircase voltage and a step voltage, means to form preset voltages each corresponding to a preset digit, comparator means comprising a plurality of comparators one for each decade, means to apply to said comparators a respective staircase and preset voltage and a step voltage, means responsive to said step voltage to shift the reference voltage of the comparator, each of said comparators comprising a pair of tubes having at least plate, grid and cathode elements, said tubes having their cathodes connected to a common voltage source, said staircase and preset voltages being applied to the grid of one tube and said step voltage being applied to the grid of the other tube, said comparator means serving to generate a voltage for application to the gate control means when said preset counting means reaches a count corresponding to said preset digit.

2. An electronic counter comprising a display counter serving to receive and count input pulses, a gate to control the application of input pulses to said counter, a binary to control the opening and closing of said signal gate, means forming timing pulses, start and stop gates to control the flow of timing pulses, said start gate being connected to control the application of timing pulses to said binary and to the preset counting means, and said stop gate being connected to control the application of timing pulses to said binary and reset gate, a display time circuit, a trigger circuit connected to control the opening and closing of said start and stop gates and to activate the display time circuit, preset counting means to receive and count said timing pulses, said preset counting means comprising a plurality of decade counters connected in cascade, each of said decade counters forming a staircase voltage and a step voltage corresponding to its count, means adapted to form preset voltages each corresponding to a preset digit, a reset gate, a reset circuit, and comparator means comprising a plurality of comparators one for each of said decades and adapted to receive a respective staircase voltage and preset voltage and a respective step voltage, means responsive to said step voltage to shift the reference voltage of the comparator, said comparator means serving to generate a voltage for application to the trigger circuit when said preset counting means reaches a count corresponding to said preset digit.

3. Apparatus as in claim 2 wherein said comparator means comprises a plurality of comparators, each of said comparators including first and second electron tubes each having plate, grid and cathode elements, the cathodes of each of said comparators being connected to a common cathode resistor, the plates of the second tube of each of the comparators being connected directly to a source of plate supply voltage, the plates of the first of said tubes being connected to a common plate load, the grids of the first of each of said tubes being connected to receive the combined preset and decade voltages, and the grids of the second of said tubes being connected to receive said step voltage.

4. Apparatus as in claim 3 wherein said means forming preset voltages comprises a tapped resistor, and prewired means for automatically connecting a predetermined voltage to the grid of the first tube of each of the comparators.

References Cited in the file of this patent
UNITED STATES PATENTS

| 2,456,226 | Thorpe | Dec. 4, 1948 |
| 2,493,627 | Grosdoff | Jan. 3, 1950 |
| 2,510,485 | Vossberg | June 6, 1950 |
| 2,539,623 | Heising | Jan. 30, 1951 |
| 2,563,841 | Jensen | Aug. 14, 1951 |
| 2,576,900 | Brockman | Nov. 27, 1951 |
| 2,672,284 | Dickinson | Mar. 16, 1954 |
| 2,717,994 | Dickinson et al. | Sept. 13, 1955 |
| 2,743,419 | Chatterton et al. | Apr. 24, 1956 |
| 2,977,046 | Dobner et al. | Mar. 28, 1961 |

OTHER REFERENCES

Tele-Tech & Electronic Industries, August 1953 ("A Preset Counter" by T. H. Thomason), pages 82, 83 and 210–212.

Proceeding of the I.R.E., October 1953 ("A Survey of Analog-to-Digital Converters" by H. Burke), page 1460 relied on.